United States Patent
Koyama et al.

(10) Patent No.: US 10,005,336 B2
(45) Date of Patent: Jun. 26, 2018

(54) VEHICLE

(71) Applicant: HONDA MOTOR CO., LTD., Tokyo (JP)

(72) Inventors: Rieko Koyama, Wako (JP); Kenta Sugitate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/460,239

(22) Filed: Mar. 16, 2017

(65) Prior Publication Data

US 2017/0267058 A1 Sep. 21, 2017

(30) Foreign Application Priority Data

Mar. 17, 2016 (JP) .................. 2016-053289

(51) Int. Cl.
| | |
|---|---|
| *B60H 1/00* | (2006.01) |
| *B60K 1/04* | (2006.01) |
| *B60L 11/18* | (2006.01) |
| *B60N 3/04* | (2006.01) |
| *B60R 13/02* | (2006.01) |
| *B60H 1/24* | (2006.01) |
| *B60H 1/34* | (2006.01) |
| *B60K 1/00* | (2006.01) |

(52) U.S. Cl.
CPC ..... *B60H 1/00278* (2013.01); *B60H 1/00564* (2013.01); *B60H 1/246* (2013.01); *B60H 1/3407* (2013.01); *B60K 1/04* (2013.01); *B60L 11/1874* (2013.01); *B60L 11/1877* (2013.01); *B60N 3/042* (2013.01); *B60N 3/048* (2013.01); *B60R 13/0237* (2013.01); *B60H 2001/003* (2013.01); *B60K 2001/005* (2013.01); *B60K 2001/0422* (2013.01); *B60Y 2306/05* (2013.01); *B60Y 2306/07* (2013.01)

(58) Field of Classification Search
CPC ............ B60H 1/00278; B60H 1/00014; B60H 1/004; B60K 11/06; B60K 1/04
See application file for complete search history.

(56) References Cited

U.S. PATENT DOCUMENTS

| | | | | |
|---|---|---|---|---|
| 6,315,069 B1 * | 11/2001 | Suba | .................. | B60K 1/04 180/68.5 |
| 7,048,321 B2 * | 5/2006 | Bandoh | .................. | B60N 2/468 180/68.5 |
| 7,678,494 B2 * | 3/2010 | Tsuchiya | ............. | B60L 11/1874 180/68.5 |
| 8,695,742 B2 | 4/2014 | Fujita et al. | | |

(Continued)

FOREIGN PATENT DOCUMENTS

JP 5400863 B2 6/2013

*Primary Examiner* — Hau V Phan
(74) *Attorney, Agent, or Firm* — Mori & Ward, LLP

(57) ABSTRACT

A vehicle includes a floor panel, a battery module, an exhaust duct, and a carpet. The battery module is disposed inside a vehicle interior. The exhaust duct is provided on the floor panel to discharge air output from the battery module through the exhaust duct. The carpet is disposed on the floor panel so as to cover the exhaust duct. The carpet has ventilation holes such that air discharged from the exhaust duct is to pass through a space between the floor panel and the carpet and to be discharged into the vehicle interior through ventilation holes.

17 Claims, 12 Drawing Sheets

(56) References Cited

U.S. PATENT DOCUMENTS

| | | | | |
|---|---|---|---|---|
| 8,875,827 B2* | 11/2014 | Watanabe | ................ | B60K 1/04 |
| | | | | 180/68.1 |
| 9,343,789 B2* | 5/2016 | Yu | ....................... | H01P 1/20381 |
| 2007/0292752 A1* | 12/2007 | Tsuchiya | ............. | B60L 11/1874 |
| | | | | 429/120 |
| 2009/0183935 A1* | 7/2009 | Tsuchiya | .................. | B60K 1/04 |
| | | | | 180/68.1 |
| 2011/0165830 A1* | 7/2011 | Smith | ................ | B60H 1/00278 |
| | | | | 454/75 |
| 2011/0239659 A1* | 10/2011 | Lior | ....................... | B60H 1/004 |
| | | | | 60/783 |
| 2011/0298241 A1* | 12/2011 | Varns | ................ | B60H 1/00014 |
| | | | | 296/64 |
| 2012/0111528 A1* | 5/2012 | Takeuchi | ................ | B60K 1/04 |
| | | | | 165/41 |
| 2014/0182957 A1* | 7/2014 | Honda | .................. | B60K 11/06 |
| | | | | 180/68.1 |
| 2014/0196866 A1* | 7/2014 | Bezzina | ............. | B60H 1/00278 |
| | | | | 165/42 |

* cited by examiner

VEHICLE

CROSS-REFERENCE TO RELATED APPLICATIONS

The present application claims priority under 35 U.S.C. § 119 to Japanese Patent Application No. 2016-053289, filed Mar. 17, 2016, entitled "Vehicle." The contents of this application are incorporated herein by reference in their entirety.

BACKGROUND

1. Field

The present disclosure relates to a vehicle.

2. Description of the Related Art

A battery module (a high-voltage battery) is disposed in a vehicle, such as a hybrid vehicle or an electric vehicle, that uses motor power to travel. For example, Japanese Patent No. 5400863 and the Description of U.S. Pat. No. 8,695,742 disclose vehicles that include a battery module disposed inside a vehicle interior and under rear seats, and an exhaust duct that discharges air that has cooled the battery module (hereinafter, as appropriate, referred to as the air that has cooled the battery).

SUMMARY

According to one aspect of the present invention, a vehicle includes a floor panel, a battery module, an exhaust duct, and a carpet. The battery module is disposed inside a vehicle interior. The exhaust duct discharges air that has cooled the battery module. The carpet is disposed on the floor panel so as to cover the exhaust duct. A plurality of ventilation holes is provided in the carpet. Air that has been discharged from the exhaust duct passes through a space between the floor panel and the carpet and is discharged into the vehicle interior from the plurality of ventilation holes.

According to another aspect of the present invention, a vehicle includes a floor panel, a battery module, an exhaust duct, and a carpet. The battery module is disposed inside a vehicle interior. The exhaust duct is provided on the floor panel to discharge air output from the battery module through the exhaust duct. The carpet is disposed on the floor panel so as to cover the exhaust duct. The carpet has ventilation holes such that air discharged from the exhaust duct is to pass through a space between the floor panel and the carpet and to be discharged into the vehicle interior through ventilation holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
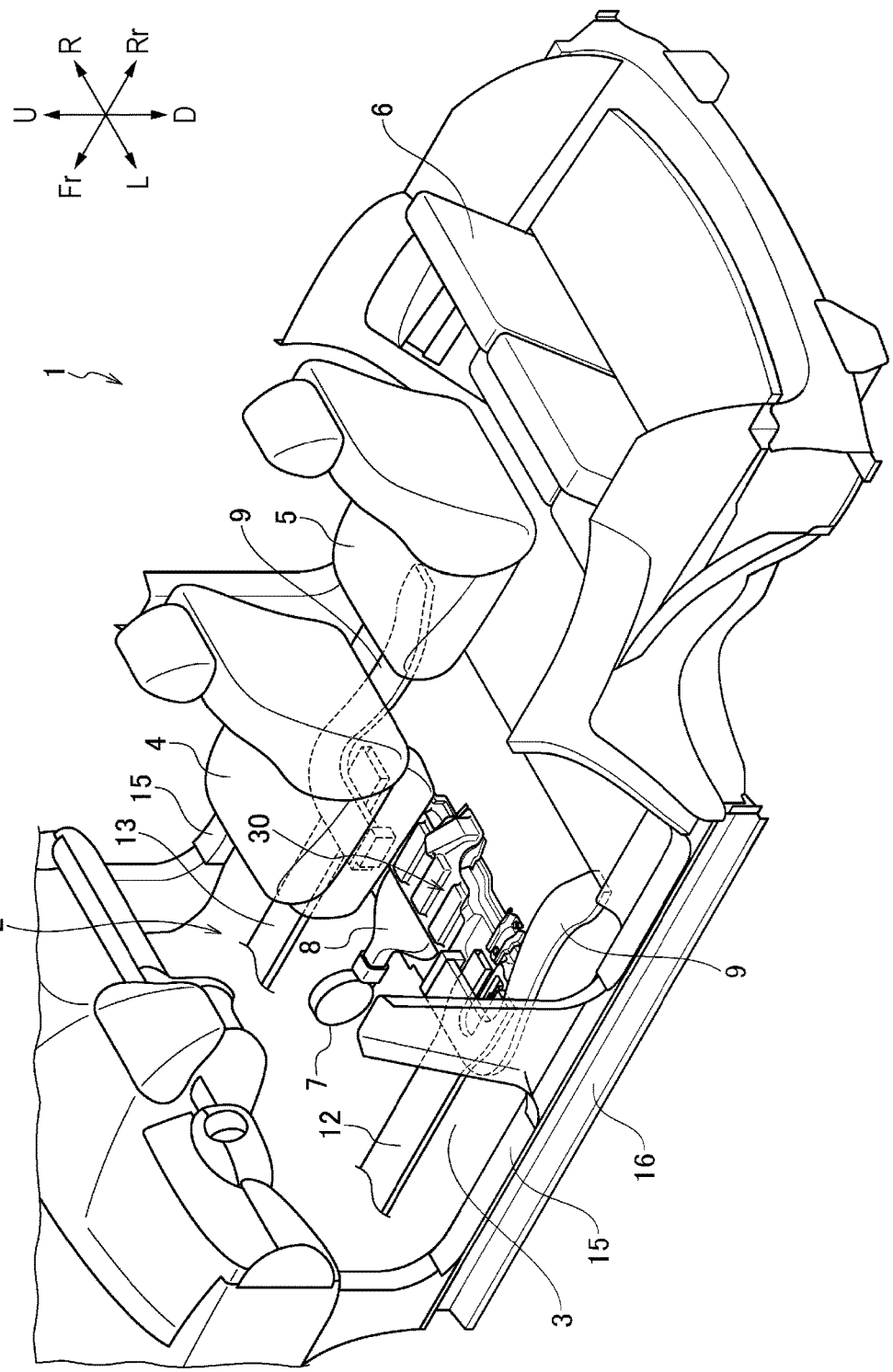
FIG. 1 is a perspective view illustrating an arrangement of main components of a vehicle interior of a vehicle according to an exemplary embodiment of the present disclosure and is a drawing in which a left front seat and a left rear seat are omitted.

The embodiments will now be described with reference to the accompanying drawings, wherein like reference numerals designate corresponding or identical elements throughout the various drawings.

Hereinafter, a vehicle of an exemplary embodiment of the present disclosure will be described with reference to the drawings. Note that the drawings are to be viewed while referring to the orientations of the signs, and in the following description, the directions such as the up and down, the left and right, and the forward and rear are based on the view of the driver. In the drawings, the front side of the vehicle is denoted as Fr, the rear side as Rr, the left side as L, the right side as R, the upper side as U, and the lower side as D.

As illustrated in FIG. 1, a vehicle 1 of the present exemplary embodiment includes, on a floor panel 3 that constitutes a floor portion of a vehicle interior 2, left and right front seats 4, left and right rear seats 5, foldable left and right third row seats 6, and a battery unit 30 that supplies electric power to a motor (not shown) and the like.

Figure 2:
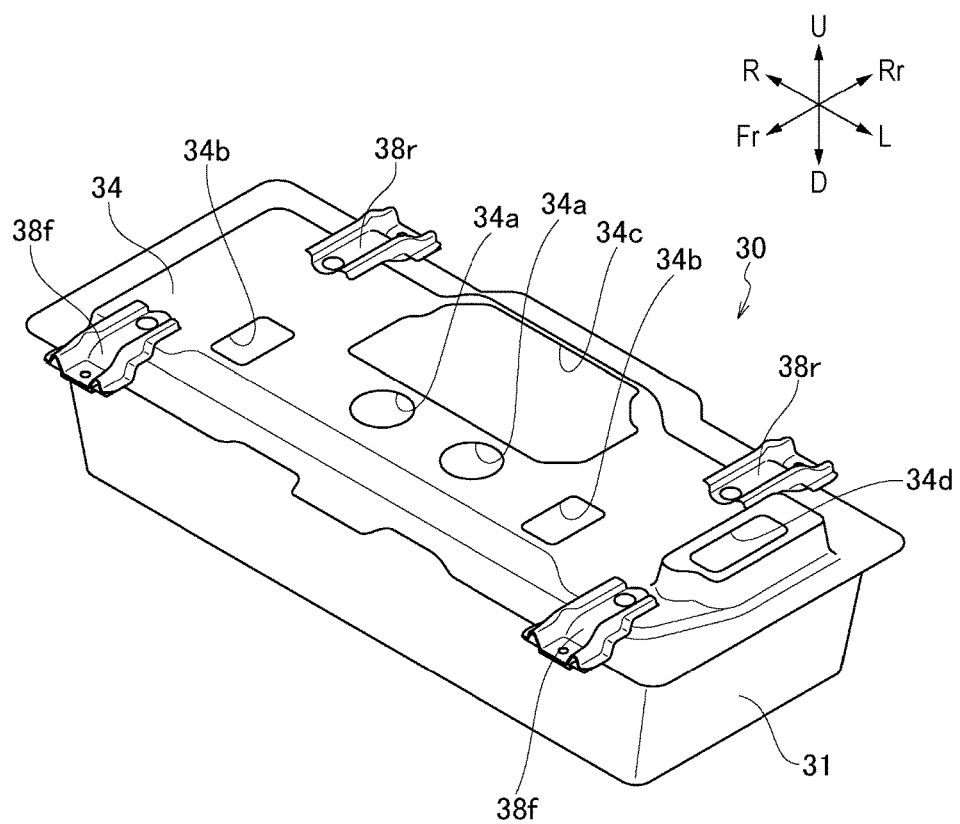
FIG. 2 is a perspective view of a battery unit according to the exemplary embodiment of the present disclosure.
Figure 3:
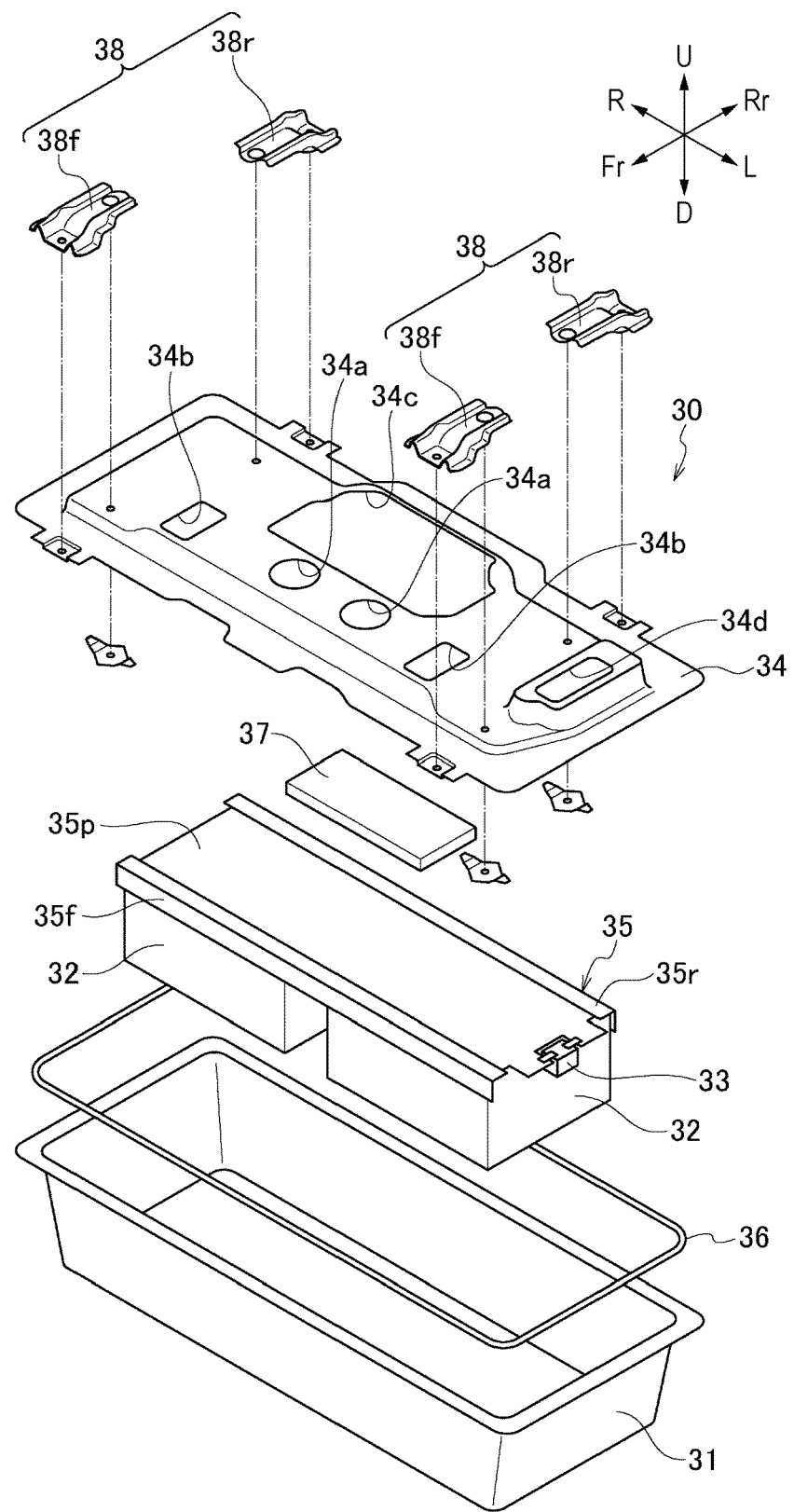
FIG. 3 is an exploded perspective view of the battery unit according to the exemplary embodiment of the present disclosure.
Figure 4:
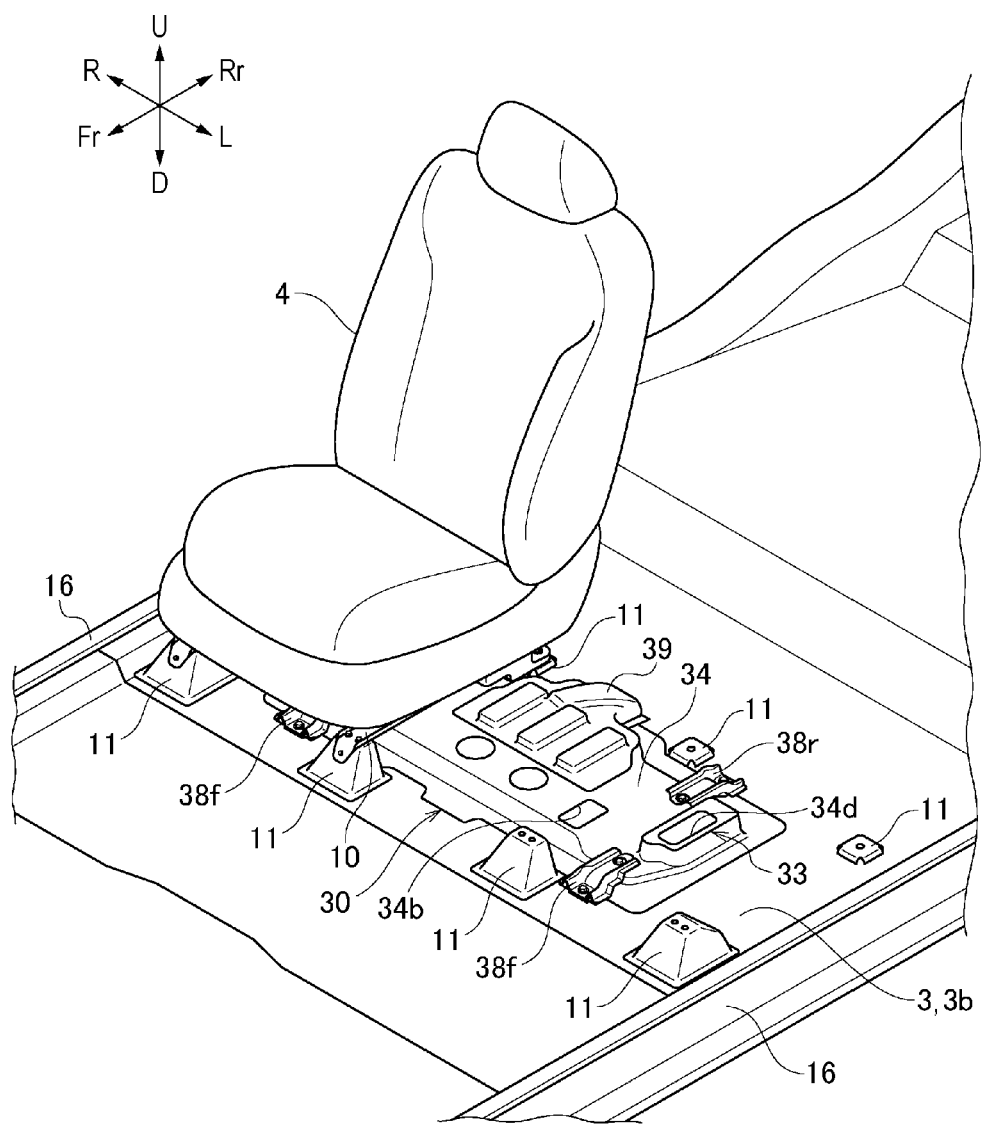
FIG. 4 is a perspective view illustrating a battery unit disposing portion of the vehicle according to the exemplary embodiment of the present disclosure viewed from the upper front side and is a drawing in which a left front seat is omitted.

As illustrated in FIGS. 2 and 3, the battery unit 30 includes a battery case 31 that has a rectangular parallelepiped shape that is long in the left-right direction in plan view, battery modules 32, a battery ECU 37, a battery cooling duct (not shown), and a plug 33 for maintenance and inspection that are accommodated in the battery case 31, and a battery cover 34 that covers an upper opening of the battery case 31.

The two battery modules 32 aligned left and right are accommodated in the battery unit 30 of the present exemplary embodiment, and the left and right battery modules 32 are connected to each other in an integrated manner by an upper frame member 35 that has a relatively high rigidity. The upper frame member 35 includes a pair of cross frames 35f and 35r that each have a substantially L-shaped cross section, and a rectangular upper panel 35p that covers upper surfaces of the two battery modules 32. The cross frame 35f is fixed to a front end portion of the upper panel 35p, and the cross frame 35r is fixed to a rear end portion of the upper panel 35p, such that a partially closed cross section is formed. The battery modules 32 output electricity to a portion external to the battery unit 30 through the battery ECU 37 that controls the charging and discharging of the battery modules 32.

The battery cooling duct is configured such that air (cold air of an air conditioner, for example) introduced from a cooling fan 7 illustrated in FIG. 1 into the battery unit 30 through an introduction duct 8 cools the battery modules 32. The air after cooling is discharged into the vehicle interior 2 through exhaust ducts 9.

The battery cover 34 covers the upper opening of the battery case 31 in a hermetically sealed state while having a sealing member 36 in between. The battery cover 34 integrally includes left and right front fixing members 38f welded to the front end portion thereof and left and right rear fixing members 38r welded to the rear end portion thereof. The battery cover 34 is fixed to the floor panel 3 through the fixing members 38.

Two air introduction ports 34a to which the introduction duct 8 is connected, two air exhaust ports 34b to which the exhaust ducts 9 are connected, an ECU access port 34c for accessing the battery ECU 37 from a portion external to the battery unit 30, and a plug access port 34d for accessing the maintenance and inspection plug 33 from a portion external to the battery unit 30 are formed in the battery cover 34.

The ECU access port 34c and the plug access port 34d are normally covered by detachable access covers 39 and 40 (see FIG. 7), respectively. The ECU access port 34c or the plug access port 34d is opened by removing the access cover 39 or 40; accordingly, access to the battery ECU 37 or the maintenance and inspection plug 33 is enabled.

The maintenance and inspection plug 33 is an operation tool for blocking the output of electricity from the battery modules 32 when maintenance and inspection of the vehicle 1 is performed. The maintenance and inspection plug 33 is disposed inside the battery case 31 and on the left side in the vehicle width direction and is operated from the outside of the battery unit 30 through the plug access port 34d of the battery cover 34.

As illustrated in FIGS. 4 to 7, the battery unit 30 is disposed in a battery accommodating recess 3a (see FIG. 6) provided under the front seats 4 and in the floor panel 3 in a recessed manner. The battery unit 30 disposed in the battery accommodating recess 3a is fixed to the floor panel 3 by being fastened to the floor panel 3 with the fixing members 38 provided in the battery cover 34.

Left and right seat rails 10 that movably support the front seat 4 in the vehicle front-rear direction and pairs of front and rear reinforcing portions 11 that support the front end portions and the rear end portions of the seat rails 10 are provided under each of the left and right front seats 4. The seat rails 10 and the reinforcing portions 11 have high rigidity so as to support the loads of the front seats 4 and the driver, and the reinforcing portions 11 are firmly fixed to the floor panel 3 by welding and the like. Furthermore, each seat rail 10 is held by being bridged across the corresponding front and rear reinforcing portions 11 provided so as to protrude upwards from a floor surface 3b of the floor panel 3.

Figure 5:
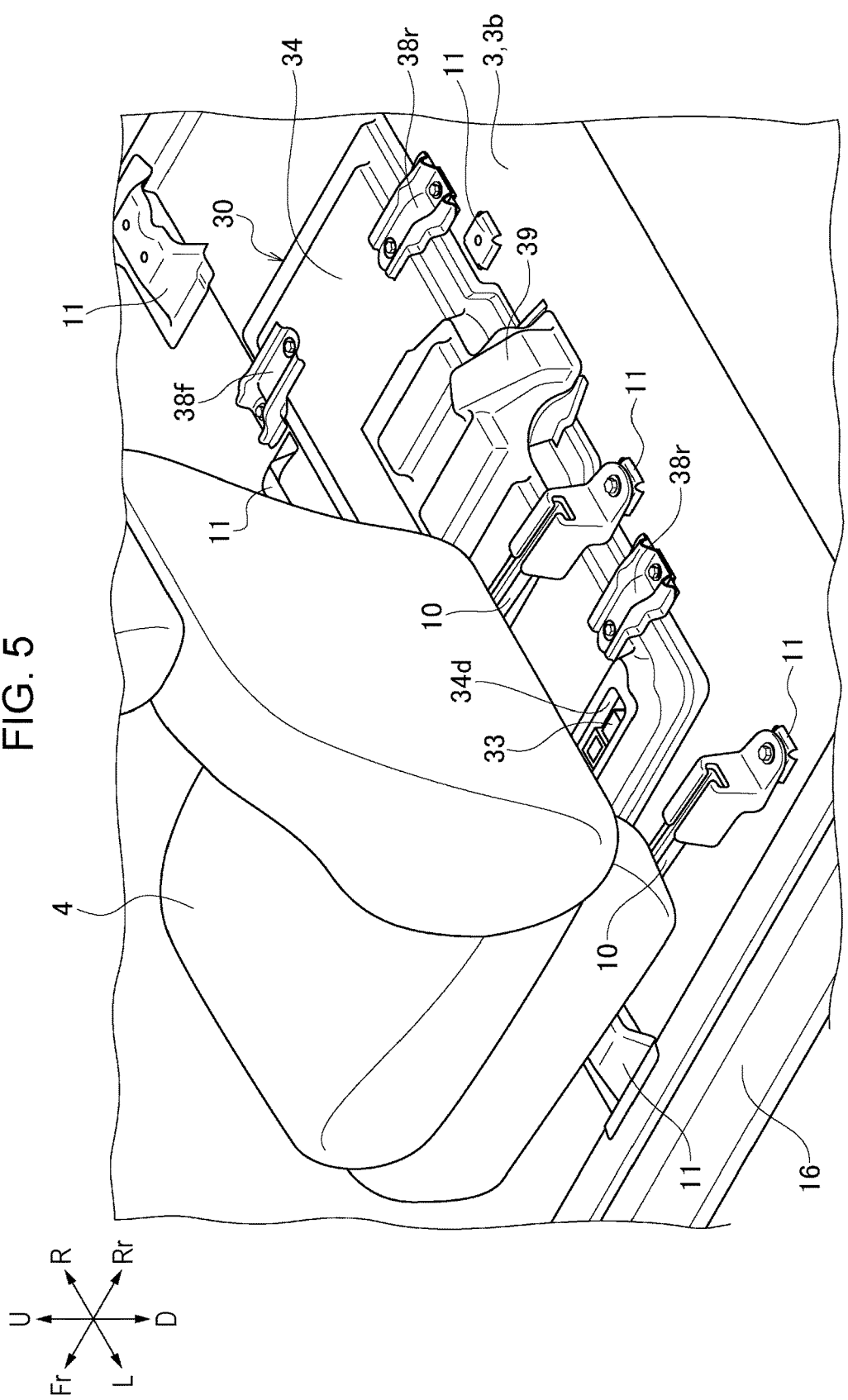
FIG. 5 is a perspective view illustrating the battery unit disposing portion of the vehicle according to the exemplary embodiment of the present disclosure viewed from the upper rear side and is a drawing in which a right front seat is omitted.
Figure 6:
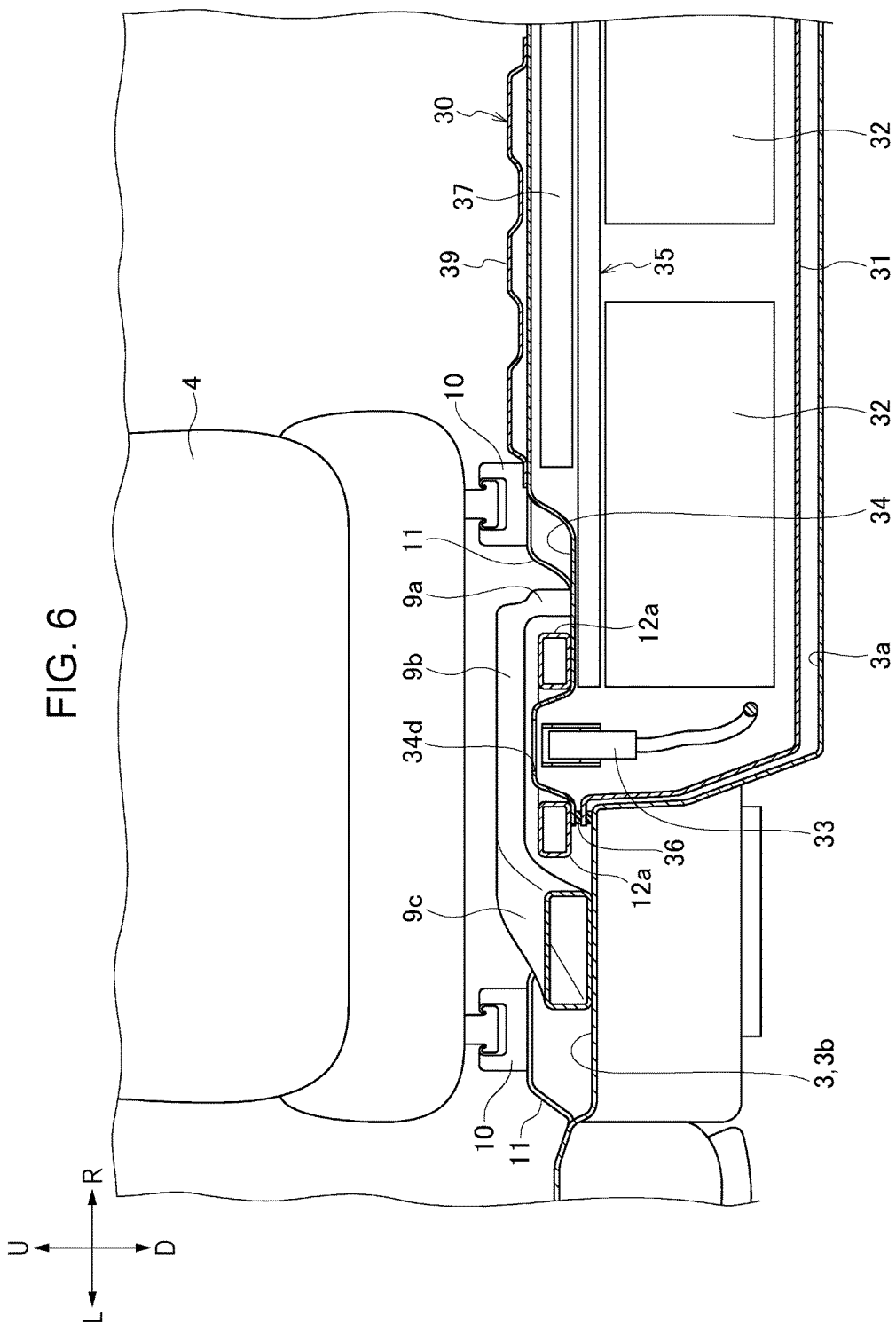
FIG. 6 is a cross-sectional view taken along line VI-VI in FIG. 7.

The position of the maintenance and inspection plug 33 in the front-rear direction is set so that the plug 33 can be accessed by moving the front seat 4 forward along the seat rails 10. In other words, while the maintenance and inspection plug 33 (an access cover 40) is hidden by the front seat 4 at normal times, when performing maintenance and inspection, as illustrated in FIG. 5, the maintenance and inspection plug 33 can be accessed by moving the front seat 4 forward.

Figure 7:
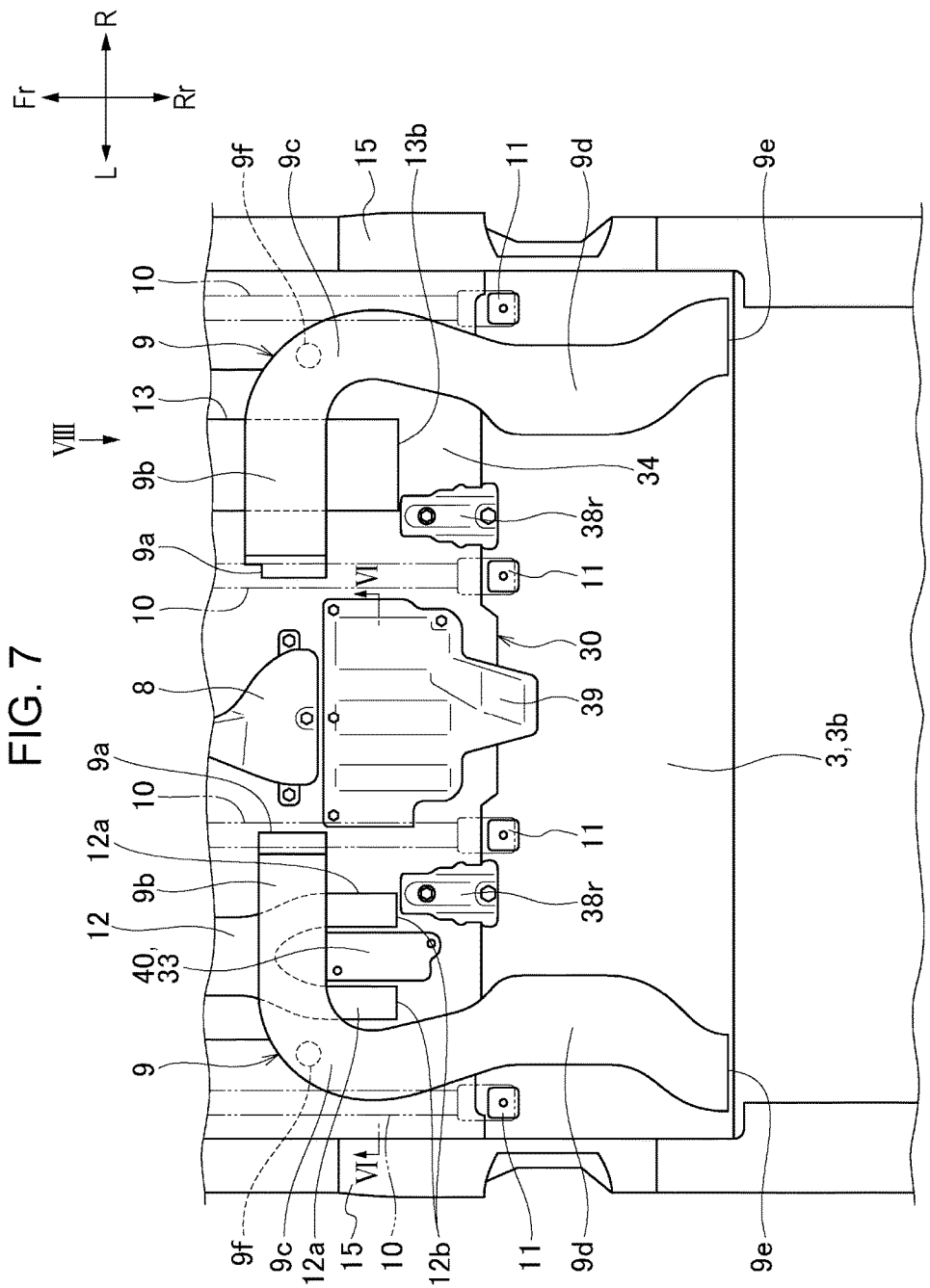
FIG. 7 is a plan view illustrating the battery unit disposing portion of the vehicle according to the exemplary embodiment of the present disclosure.

As illustrated in FIG. 7, a pair of left and right heater ducts 12 and 13 that extend in the vehicle front-rear direction are disposed under the left and right front seats 4 and above the battery cover 34 (or the floor panel 3). The left and right heater ducts 12 and 13 discharge hot air from the air conditioner that is connected to the front ends thereof towards the foot space of the rear seats 5 from discharge ports 12b and 13b at the rear ends thereof. Furthermore, the left and right heater ducts 12 and 13 each have a wide and flat shape so as to, while securing the needed cross-sectional areas of the flow paths, restrict the height dimension thereof.

Among the left and right heater ducts 12 and 13, the heater duct 12 on the left side includes left and right branch portions 12a that are branched to the left and right at the rear end side of the heater duct 12. The maintenance and inspection plug 33 is disposed so as to be positioned between the left and right branch portions 12a. With the above, the maintenance and inspection plug 33 can be accessed without dismounting the heater duct 12.

As illustrated in FIGS. 7 to 12, the left and right exhaust ducts 9 are disposed so as to be substantially symmetrical to each other with respect to the center of the vehicle, and each have a wide and flat shape so as to, while securing the needed cross-sectional areas of the flow paths, restrict the height dimension thereof. Specific components of the exhaust ducts 9 include battery connecting portions 9a connected to the air exhaust ports 34b of the battery cover 34, vehicle width direction extension portions 9b provided so as to extend outwards from the battery connecting portions 9a in the vehicle width direction, bend portions 9c that extend from outer end portions of the vehicle width direction extension portions 9b and along the inside of the seat rails 10 of the front seats 4 on the outer side in the vehicle width direction towards the rear of the vehicle, front-rear direction extension portions 9d that extend from the bend portions 9c towards the rear of the vehicle in the vehicle front-rear direction, first exhaust ports 9e that are formed at the rear ends of the front-rear direction extension portions 9d and that discharge air, which has cooled the battery, at portions under the rear seats 5, and second exhaust ports 9f that are formed in the undersides of the bend portions 9c so as to oppose the floor panel 3 and that discharge air, which has cooled the battery, towards the floor panel 3.

The vehicle width direction extension portions 9b of the exhaust ducts 9 are disposed so as to intersect the upper portions of the heater ducts 12 and 13 in order to avoid interfering the heater ducts 12 and 13 at portions under the front seats 4. Furthermore, in intersecting the upper portion of the heater duct 12, the vehicle width direction extension portions 9b of the exhaust duct 9 on the left side that is among the left and right exhaust ducts 9 is disposed so as to pass the upper front side of the maintenance and inspection plug 33 (the plug access port 34d). With the above, the maintenance and inspection plug 33 can be accessed without dismounting the exhaust ducts 9.

Figure 10:
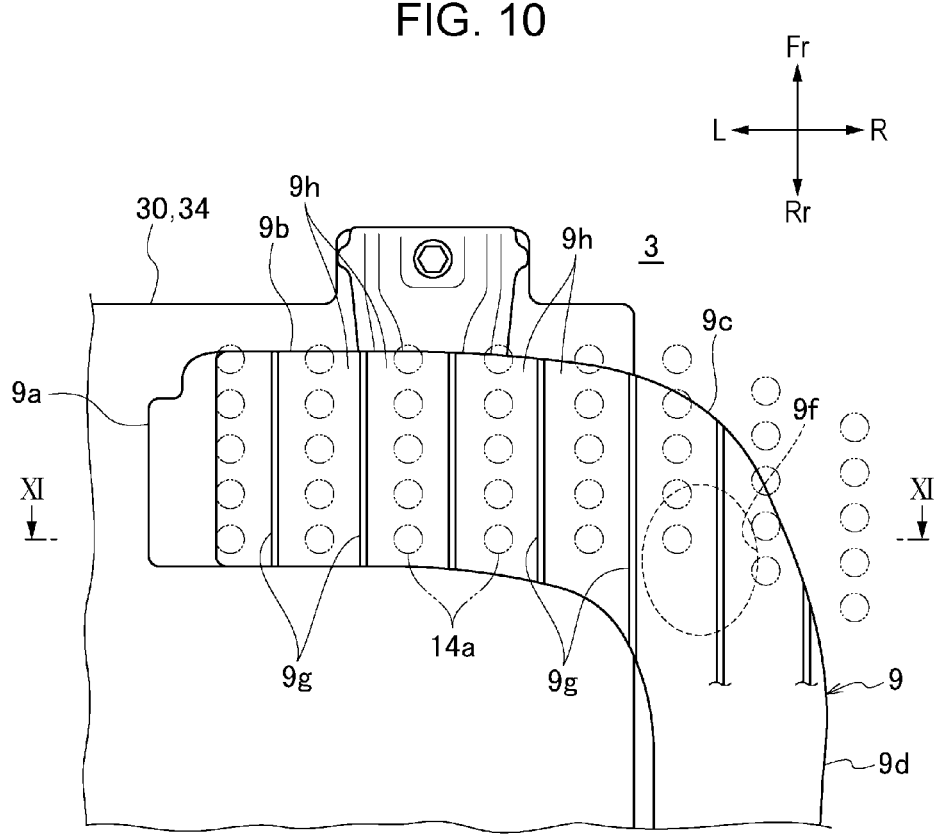
FIG. 10 is a plan view of an essential portion of the exhaust duct according to the exemplary embodiment of the present disclosure illustrating a positional relationship between a second exhaust port and ventilation holes of a carpet.

The exhaust ducts 9 are disposed between a carpet 14, which is disposed above the floor panel 3, and the floor panel 3. As illustrated in FIG. 10, a plurality of ventilation holes 14a arranged in the vehicle width direction and the vehicle front-rear direction are formed in the carpet 14 under the front seats 4 and in areas covering the vehicle width direction extension portions 9b and the bend portions 9c of the exhaust ducts 9 from above. Meanwhile, in the exhaust ducts 9, a plurality of protrusions 9g that have a rib shape extending along the vehicle front-rear direction and that are aligned in a parallel manner in the vehicle width direction are formed on the upper surfaces of the vehicle width direction extension portions 9b and the bend portions 9c that are covered by the carpet 14. Recesses 9h are formed between adjacent protrusions 9g, and the carpet 14 being supported by the protrusions 9g forms spaces with the protrusions 9g adjacent to the carpet 14 and the recesses 9h. As described above, by securing spaces between the upper surfaces of the exhaust ducts 9 and the carpet 14, the ventilation holes 14a of the carpet 14 are prevented from being blocked by the upper surfaces of the exhaust ducts 9.

Figure 8:
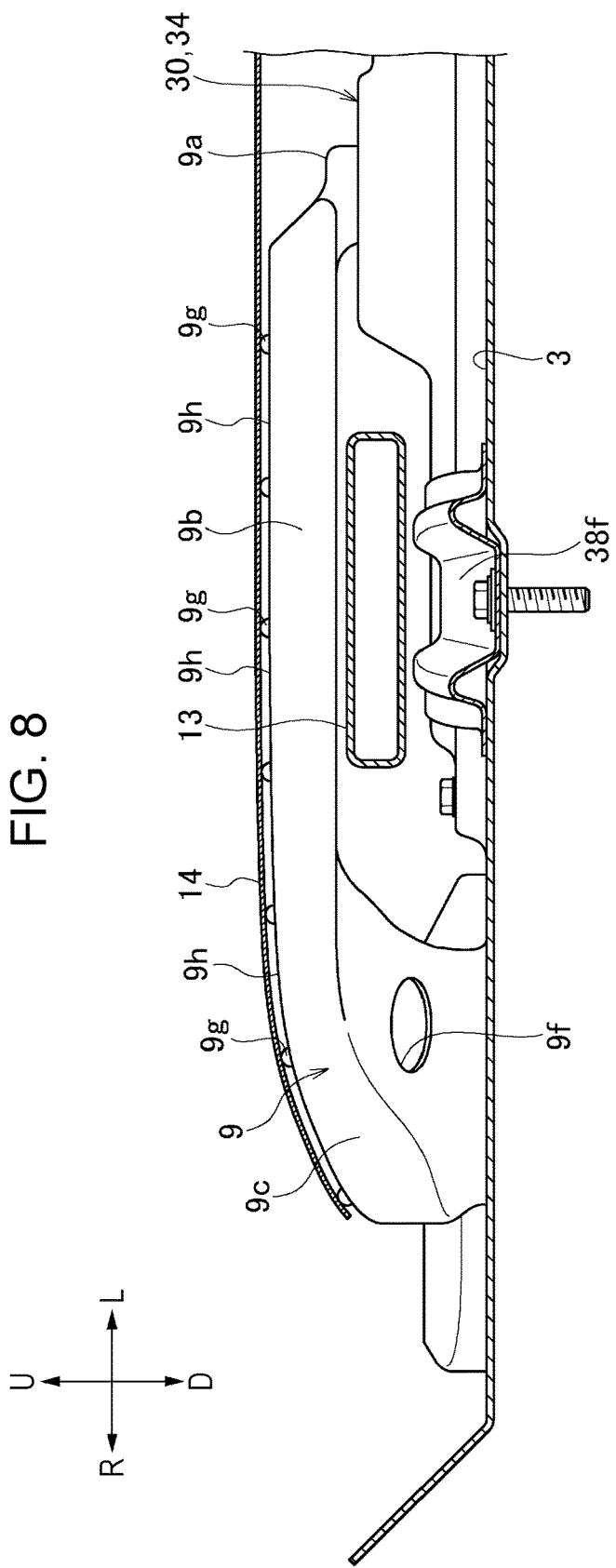
FIG. 8 is a front view illustrating the battery unit disposing portion viewed from under the right front seat (from an arrow VIII in FIG. 7) of the vehicle according to the exemplary embodiment of the present disclosure.
Figure 9:
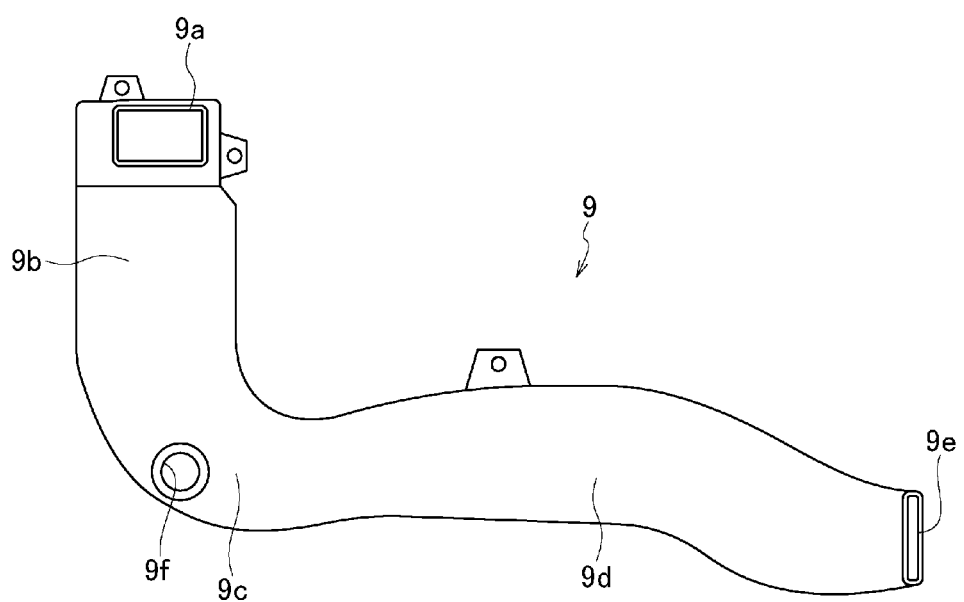
FIG. 9 is a bottom view of an exhaust duct according to the exemplary embodiment of the present disclosure.
Figure 11:
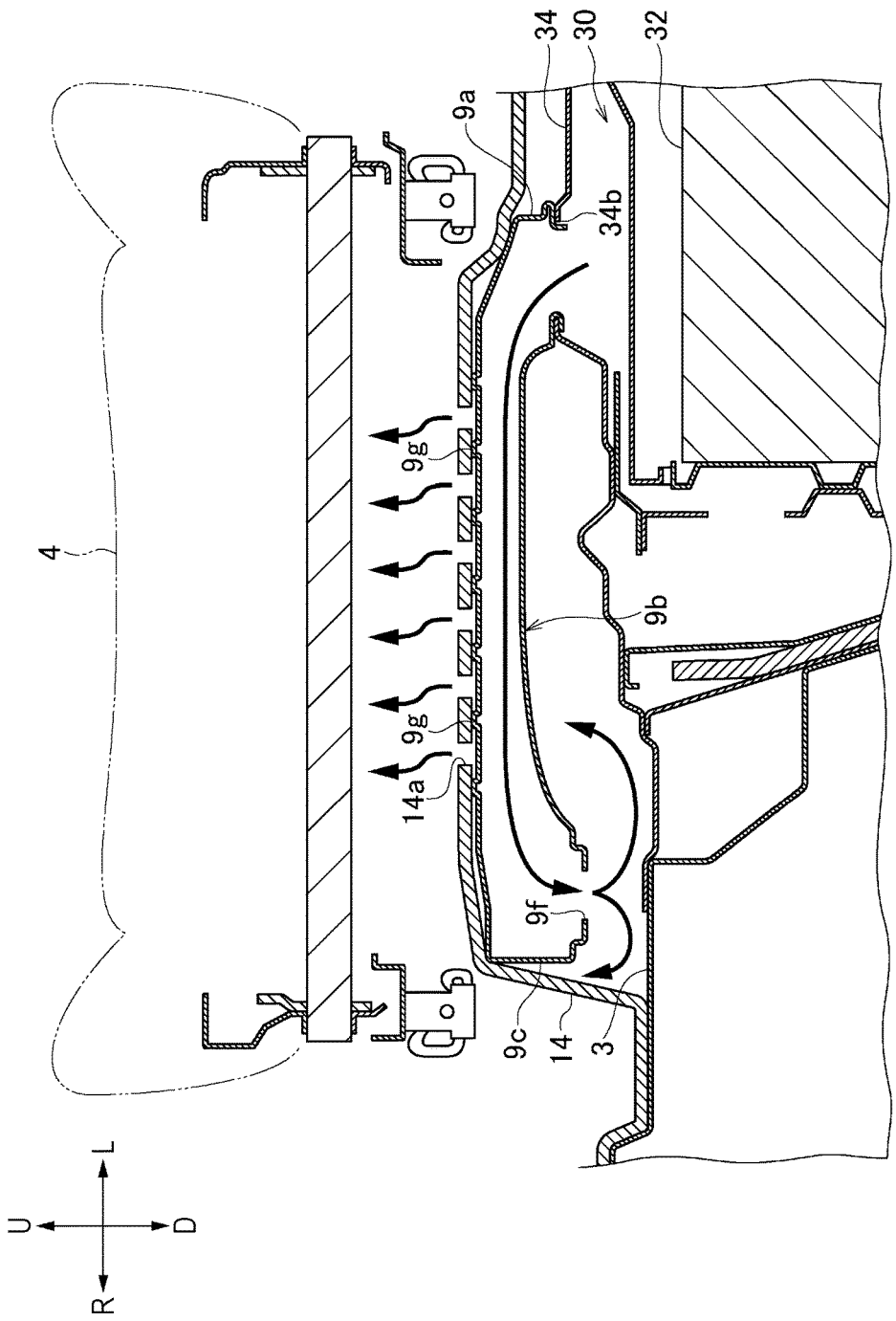
FIG. 11 is a cross-sectional view taken along line XI-XI in FIG. 10.

As illustrated in FIGS. 7 and 11, the bend portions 9c of the exhaust ducts 9 are positioned near the side trims 15 that are positioned under the front seats 4 and that cover the upper side and the inner side of side members 16 (see FIG. 1, for example). Referring also to FIGS. 8 and 9, the undersides of the bend portions 9c oppose the floor panel 3 at a predetermined interval, and the second exhaust ports 9f are formed in the above interval. The second exhaust ports 9f being formed in the bend portions 9c where swirl flows are easily generated can favorably discharge a portion of the air that has cooled the battery and that is flowing inside the exhaust ducts 9.

The air that has cooled the battery and that is discharged towards the floor panel 3 from the second exhaust ports 9f of the exhaust ducts 9 impinges on the floor panel 3 and flows along the floor panel 3 such that the air is dispersed. Subsequently, the air that has cooled the battery and that is filled in the spaces between the carpet 14 and the floor panel 3 is exhausted in a dispersed manner to the space under the front seats 4 through the plurality of ventilation holes 14a formed in the carpet 14.

Figure 12:
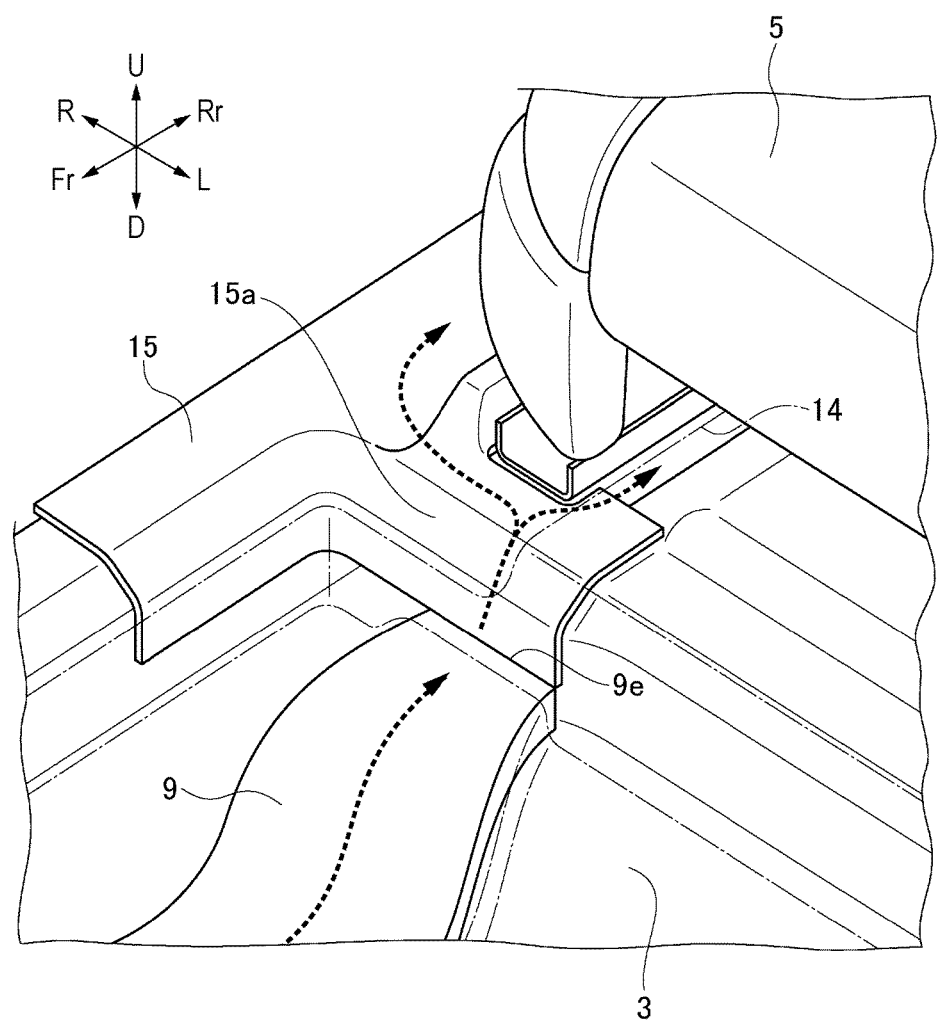
FIG. 12 is a perspective view of the exhaust duct according to the exemplary embodiment of the present disclosure illustrating flows of the air discharged from the first exhaust port.

As illustrated in FIGS. 7 and 12, the first exhaust ports 9e of the exhaust ducts 9 are positioned at the lower front end (foot space) of the rear seats 5 and near the side trims 15, and discharge the air that has cooled the battery towards the spaces between the extension portions 15a of the side trims 15 covered by the carpet and the floor panel 3. The air that has cooled the battery and that has been discharged to the spaces between the extension portions 15a of the side trims 15 and the floor panel 3 passes through the spaces between the side members 16 and the side trims 15, is discharged to a rear portion of the vehicle interior 2 (a rear space of the third row seat 6, for example), passes through the spaces between the floor panel 3 and the carpet 14 under the rear seats 5, and is discharged to a space under the rear seats 5 from opening portions (not shown) provided in the carpet 14.

As described above, in the vehicle 1 of the present exemplary embodiment, since the air that has cooled the battery and that has been discharged from the exhaust ducts 9 passes through the spaces between the floor panel 3 and the carpet 14 and is discharged inside the vehicle interior 2 from the plurality of ventilation holes 14a formed in the carpet 14, the air that has cooled the battery can be exhausted inside the vehicle interior 2 in a dispersed manner without causing discomfort to the occupant.

Furthermore, since the exhaust ducts 9 include the first exhaust ports 9e provided at the duct end portions, and the second exhaust ports 9f provided in the undersides of the ducts between the battery connecting portions 9a and the duct end portions so as to oppose the floor panel 3, the air that has cooled the battery can be discharged from a plurality of positions even in a case of a single exhaust duct 9 that has no branch pipes. Furthermore, since the second exhaust ports 9f oppose the floor panel 3, the air that has cooled the battery not only can be discharged while suppressing pressure loss but can be dispersed by using the floor panel 3.

Furthermore, since the exhaust ducts 9 have the protrusions 9g on the upper surface thereof, spaces can be secured between the upper surface of the exhaust ducts 9 and the carpet 14 that is disposed thereon; accordingly, the ventilation holes 14a of the carpet 14 can be prevented from being blocked by the upper surfaces of the exhaust ducts 9.

Furthermore, since the first exhaust ports 9e and the second exhaust ports 9f are provided near the side trims 15, even in a case in which the intake port (not shown) of the air conditioner is provided in the center console (not shown), the air that has cooled the battery and that has been discharged from the exhaust ducts 9 can be prevented from being taken directly into the intake port of the air conditioner by distancing the first exhaust ports 9e and the second exhaust ports 9f away from the intake port.

Furthermore, since the battery modules 32 are disposed under the front seats 4 and in the battery accommodating recess 3a provided in the floor panel 3 in a recessed manner, not only a large space can be secured inside the vehicle interior but the front seats 4 can be disposed at low positions. Furthermore, since the exhaust ducts 9 are provided so as to extend rearwardly from the battery modules 32 and a portion of the air that has cooled the battery discharged from the first exhaust ports 9e is discharged rearwardly through the spaces between the side members 16 and the side trims 15, the air that has cooled the battery can be exhausted in a further dispersed manner without causing discomfort to the occupant.

Furthermore, since the first exhaust ports 9e are disposed under the rear seats 5, the air that has cooled the battery can be exhausted in a further dispersed manner without causing discomfort to the occupant.

Note that the present disclosure is not limited to the exemplary embodiment described above, and change in shape, modifications, and the like may be performed appropriately.

A vehicle (vehicle of an exemplary embodiment described later, for example) according to a first aspect of the exemplary embodiment includes a floor panel (a floor panel of the exemplary embodiment described later, for example), a battery module (a battery module of the exemplary embodiment described later, for example) disposed inside a vehicle interior (a vehicle interior of the exemplary embodiment described later, for example), an exhaust duct (an exhaust duct of the exemplary embodiment described later, for example) that discharges air that has cooled the battery module, and a carpet (a carpet of the exemplary embodiment described later, for example) disposed on the floor panel so as to cover the exhaust duct, in which a plurality of ventilation holes (ventilation holes of the exemplary embodiment described later, for example) are provided in the carpet, and in which air that has been discharged from the exhaust duct passes through a space between the floor panel and the carpet and is discharged into the vehicle interior from the plurality of ventilation holes.

According to the first aspect of the exemplary embodiment, since the air that has cooled the battery and that has been discharged from the exhaust duct passes through the space between the floor panel and the carpet and is discharged into the vehicle interior from the plurality of ventilation holes formed in the carpet, the air that has cooled the battery can be exhausted inside the vehicle interior in a dispersed manner without causing discomfort to the occupant.

A vehicle according to a second aspect of the exemplary embodiment may be the vehicle according to the first aspect in which the exhaust duct includes a first exhaust port (a first exhaust port of the exemplary embodiment described later, for example) provided at a duct end portion, and a second exhaust port (a second exhaust port of the exemplary embodiment described later, for example) provided in an underside of the duct between a battery connecting portion (a battery connecting portion of the exemplary embodiment described later, for example) and the duct end portion so as to oppose the floor panel.

According to the second aspect of the exemplary embodiment, since the exhaust duct includes the first exhaust port provided at the duct end portion, and the second exhaust port provided in the underside of the duct between the battery connecting portion and the duct end portion so as to oppose the floor panel, the air that has cooled the battery can be discharged from a plurality of positions even in a case of a single exhaust duct that has no branch pipes. Furthermore, since the second exhaust port oppose the floor panel, the air that has cooled the battery not only can be discharged while suppressing pressure loss but can be dispersed by using the floor panel.

A vehicle according to a third aspect of the exemplary embodiment may be the vehicle according to the second aspect in which the exhaust duct includes a protruding and recessed portion (a protrusion and a recess of the exemplary embodiment described later, for example) on an upper surface thereof.

According to the third aspect of the exemplary embodiment, since the exhaust duct has the protruding and recessed portion on the upper surface thereof, a space can be secured between the upper surface of the exhaust duct and the carpet that is disposed thereon; accordingly, the ventilation holes of the carpet can be prevented from being blocked by the upper surface of the exhaust duct.

A vehicle according to a fourth aspect of the exemplary embodiment may be the vehicle according to the second aspect in which the first exhaust port and/or the second exhaust port is provided near a side trim (a side trim of the exemplary embodiment described later, for example).

According to the fourth aspect of the exemplary embodiment, since the first exhaust port and/or the second exhaust port is provided near the side trim, even in a case in which an intake port of the air conditioner is provided in a center console, the air that has cooled the battery and that has been discharged from the exhaust duct can be prevented from being taken directly into the intake port of the air conditioner by distancing the first exhaust port and/or the second exhaust port away from the intake port.

A vehicle according to a fifth aspect of the exemplary embodiment may be the vehicle according to the fourth aspect in which the battery module is disposed in a battery accommodating recess (a battery accommodating recess of the exemplary embodiment described later, for example), the battery accommodating recess being provided under a front seat and in the floor panel in a recessed manner, in which the exhaust duct is provided so as to extend rearwardly from the battery module, and in which the air that has been discharged from the first exhaust port passes through a space between a side member (a side member of the exemplary embodiment described later, for example) and the side trim and is discharged rearwardly.

According to the fifth aspect of the exemplary embodiment, since the battery module is disposed under the front seat and in the battery accommodating recess provided in the floor panel in a recessed manner, not only a large space can be secured inside the vehicle interior but the front seat can be disposed at a low position. Furthermore, since the exhaust duct is provided so as to extend rearwardly from the battery module and the air that has been discharged from the first exhaust port passes through the space between the side member and the side trim and is discharged rearwardly, the air that has cooled the battery can be exhausted in a further dispersed manner without causing discomfort to the occupant.

A vehicle according to a sixth aspect of the exemplary embodiment may be the vehicle according to the fifth aspect in which the second exhaust port is disposed under the front seat, and in which the first exhaust port is disposed under the rear seat (a rear seat of the exemplary embodiment described later, for example).

According to the sixth aspect of the exemplary embodiment, since the second exhaust port is disposed under the front seat, and the first exhaust port is disposed under the rear seat, the air that has cooled the battery can be exhausted in a further dispersed manner without causing discomfort to the occupant.

Obviously, numerous modifications and variations of the present invention are possible in light of the above teachings. It is therefore to be understood that within the scope of the appended claims, the invention may be practiced otherwise than as specifically described herein.

What is claimed is:
1. A vehicle comprising:
a floor panel;
a battery module disposed inside a vehicle interior;
an exhaust duct that discharges air that has cooled the battery module; and
a carpet disposed on the floor panel so as to cover the exhaust duct,
wherein a plurality of ventilation holes are provided in the carpet, and
wherein air that has been discharged from the exhaust duct passes through a space between the floor panel and the carpet and is discharged into the vehicle interior from the plurality of ventilation holes.
2. The vehicle according to claim 1,
wherein the exhaust duct includes a first exhaust port provided at a duct end portion, and a second exhaust port provided in an underside of the duct between a battery connecting portion and the duct end portion so as to oppose the floor panel.
3. The vehicle according to claim 2,
wherein the exhaust duct includes a protruding and recessed portion on an upper surface thereof.
4. The vehicle according to claim 2,
wherein the first exhaust port and/or the second exhaust port is provided near a side trim.
5. The vehicle according to claim 4,
wherein the battery module is disposed in a battery accommodating recess, the battery accommodating recess being provided under a front seat and in the floor panel in a recessed manner,
wherein the exhaust duct is provided so as to extend rearwardly from the battery module, and
wherein the air that has been discharged from the first exhaust port passes through a space between a side member and the side trim and is discharged rearwardly.

6. The vehicle according to claim 5,
wherein the second exhaust port is disposed under the front seat, and
wherein the first exhaust port is disposed under a rear seat.

7. The vehicle according to claim 1,
wherein the air that has been discharged from the exhaust duct passes through the space between the floor panel and the carpet and is discharged into the vehicle interior from the plurality of ventilation holes provided below a seat.

8. The vehicle according to claim 1,
wherein the exhaust duct has at least one exhaust port configured to allow the air to exit the exhaust duct, and
wherein the at least one exhaust port is provided below a seat.

9. The vehicle according to claim 1,
wherein the exhaust duct has at least one exhaust port configured to allow the air to exit the exhaust duct,
wherein the at least one exhaust port is provided underneath the carpet, and
wherein the air that has been discharged from the at least one exhaust port passes through the space between the floor panel and the carpet and is discharged into the vehicle interior from the plurality of ventilation holes.

10. A vehicle comprising:
a floor panel;
a battery module disposed inside a vehicle interior;
an exhaust duct provided on the floor panel to discharge air output from the battery module through the exhaust duct; and
a carpet disposed on the floor panel so as to cover the exhaust duct, the carpet having ventilation holes such that air discharged from the exhaust duct is to pass through a space between the floor panel and the carpet and to be discharged into the vehicle interior through ventilation holes.

11. The vehicle according to claim 10,
wherein the exhaust duct includes a first exhaust port provided at a duct end portion, and a second exhaust port provided in an underside of the duct between a battery connecting portion and the duct end portion so as to oppose the floor panel.

12. The vehicle according to claim 11,
wherein the exhaust duct includes a protruding and recessed portion on an upper surface thereof.

13. The vehicle according to claim 11,
wherein the first exhaust port and/or the second exhaust port is provided near a side trim.

14. The vehicle according to claim 13,
wherein the battery module is disposed in a battery accommodating recess, the battery accommodating recess being provided under a front seat and in the floor panel in a recessed manner,
wherein the exhaust duct is provided so as to extend rearwardly from the battery module, and
wherein the air that has been discharged from the first exhaust port passes through a space between a side member and the side trim and is discharged rearwardly.

15. The vehicle according to claim 14,
wherein the second exhaust port is disposed under the front seat, and
wherein the first exhaust port is disposed under a rear seat.

16. The vehicle according to claim 10,
wherein the exhaust duct has at least one exhaust port configured to allow the air to exit the exhaust duct, and
wherein the at least one exhaust port is provided below a seat.

17. The vehicle according to claim 10,
wherein the exhaust duct has at least one exhaust port configured to allow the air to exit the exhaust duct,
wherein the at least one exhaust port is provided underneath the carpet, and
wherein the air discharged from the at least one exhaust port is to pass through the space between the floor panel and the carpet and to be discharged into the vehicle interior through ventilation holes.

* * * * *